(12) United States Patent
Nie (10) Patent No.: US 12,074,994 B2
(45) Date of Patent: Aug. 27, 2024

(54) CONNECTION STRUCTURE AND FOLDABLE TERMINAL DEVICE

(71) Applicant: WUHAN CHINA STAR OPTOELECTRONICS SEMICONDUCTOR DISPLAY TECHNOLOGY CO., LTD., Wuhan (CN)

(72) Inventor: Dawen Nie, Wuhan (CN)

( * ) Notice: Subject to any disclaimer, the term of this patent is extended or adjusted under 35 U.S.C. 154(b) by 0 days.

(21) Appl. No.: 17/622,874

(22) PCT Filed: Dec. 17, 2021

(86) PCT No.: PCT/CN2021/139232
§ 371 (c)(1),
(2) Date: Dec. 27, 2021

(87) PCT Pub. No.: WO2023/108624
PCT Pub. Date: Jun. 22, 2023

(65) Prior Publication Data
US 2024/0040019 A1    Feb. 1, 2024

(30) Foreign Application Priority Data
Dec. 14, 2021   (CN) .......................... 202111530333.1

(51) Int. Cl.
*H04M 1/02*   (2006.01)
*G06F 1/16*   (2006.01)

(52) U.S. Cl.
CPC ........ *H04M 1/0214* (2013.01); *G06F 1/1681* (2013.01)

(58) Field of Classification Search
CPC ........................... H04M 1/0214; G06F 1/1681
USPC ........................................................ 455/575.3
See application file for complete search history.

(56) References Cited

U.S. PATENT DOCUMENTS

| 6,708,046 | B1 * | 3/2004 | Takagi | ................ H04M 1/0216 455/90.3 |
| 2003/0071047 | A1 | 4/2003 | Harada | |
| 2017/0247923 | A1 | 8/2017 | Hirtsiefer et al. | |
| 2023/0115172 | A1 * | 4/2023 | Lombardi | ............. G06F 1/1681 361/679.27 |

FOREIGN PATENT DOCUMENTS

| CN | 104482037 A | 4/2015 |
| CN | 104565013 A | 4/2015 |
| CN | 208919062 U | 5/2019 |
| CN | 210830134 U | 6/2020 |
| CN | 112073563 A | 12/2020 |
| WO | 2016082345 A1 | 6/2016 |

* cited by examiner

*Primary Examiner* — Eugene Yun (57) ABSTRACT

A connection structure and a foldable terminal device are provided. The connection structure includes a first connecting member, a second connecting member, and a damping mechanism connected to the first connecting member and the second connecting member. The damping mechanism is configured to achieve hovering of the first connecting member and the second connecting member, so that arbitrary angle hovering in a wide range of angles can be realized. In addition, a certain sense of damping can be fed back to users through the damping mechanism, so that the user experience is improved.

17 Claims, 6 Drawing Sheets

CONNECTION STRUCTURE AND FOLDABLE TERMINAL DEVICE

BACKGROUND OF INVENTION

1. Field of Invention

The present application relates to a technical field of displays, and particularly to, a connection structure and a foldable terminal device.

2. Related Art

Foldable mobile phones, as a development direction of future mobile phones, have now become a research hotspot for various mobile phone and panel manufacturers. One of key technologies to achieve folding mobile phones is the design of hinges. Hinges are key components of mobile phones to realize dynamic folding. Currently, hinges of the foldable mobile phones can only be hovered at certain angles during actual use, and cannot hover at any desired angle for display. In addition, current foldable mobile phones can only hover at certain angles during use. As number of bending times increases, hinge components used to control folding, unfolding, and hover will wear out, which greatly diminishes a sense of damping fed back to users, or even causes ineffectiveness, thereby significantly lessening the user experience.

SUMMARY OF INVENTION

An object of the present application is to provide a connection structure and a foldable terminal device to achieve hovering at a wide range of angles and improve the use experience.

In a first aspect, the present application provides a connection structure, including a first connecting member; a second connecting member; a damping mechanisms connected to the first connecting member and the second connecting member. When the second connecting member rotates from a first position to a second position relative to the first connecting member under an action of an external force, the damping mechanism generates a damping force that hinders the rotation of the second connecting member, and when the external force disappears, the damping mechanism keeps the second connecting member in the second position. In this application, the damping mechanism is configured to achieve hovering of the first connecting member and the second connecting member. Specifically, when the second connecting member rotates from the first position to the second position relative to the first connecting member under an action of an external force, the damping mechanism generates the damping force that hinders the rotation of the second connecting member. When the external force disappears, the damping mechanism keeps the second connecting member in the second position, thereby achieving arbitrary angle hovering in a wide range of angles. In addition, it can also feedback a certain sense of damping to users through the damping mechanism, thereby improving the user experience.

Optionally, a number of the damping mechanisms is N, N is an integer, and a value of N is greater than or equal to two, wherein a connecting seam is located between the first connecting member and the second connecting member, and the N damping mechanisms are sequentially arranged along the connecting seam. By providing a plurality of the damping mechanisms, the uniformity of the force on the first connecting member and the second connecting member can be improved.

Optionally, in some embodiments of this application, at least M of the N damping mechanisms provide different damping forces, wherein M is an integer and 1≤M. The present application is provided with multiple damping mechanisms, and the damping forces provided by the multiple damping mechanisms are different. Although the damping forces provided by the damping mechanisms will decrease with a length of time in use, the damping mechanisms can make the overall damping force drop more smoothly. Furthermore, service life of the connection structure can be prolonged, and a damping force reduction range during the service life is smaller, so that the user experience is better.

Optionally, in some embodiments of this application, the value of N is three, and the three damping mechanisms are a first damping mechanism, a second damping mechanism, and a third damping mechanism, respectively. Specifically, the damping forces provided by the first damping mechanism, the second damping mechanism, and the third damping mechanism gradually decrease. The three damping mechanisms can make the overall damping force decrease more smoothly, and can further increase the service life of the connection structure, and the damping force reduction range during the service life is smaller, so that the user experience is better.

Optionally, in some embodiments of the present application, the first damping mechanism, the third damping mechanism, and the second damping mechanism are arranged in order along the connecting seam. The third damping mechanism that provides the smallest damping force and is disposed in the middle can improve the uniformity of the force on the hinge structure during use. During the early use of the connection structure, the first damping mechanism plays a main role in damping. As the use time increases, the first damping mechanism and the second damping mechanism play the main damping role. At this time, the third damping mechanism is located between the first damping mechanism and the second damping mechanism. The damping forces provided by the first damping mechanism and the second damping mechanism are symmetrically distributed on upper and lower sides of the third damping mechanism, so that the uniformity of the force as applied can be improved.

Optionally, in some embodiments of the present application, the value of N is five, and the five damping mechanisms are a first damping mechanism, a second damping mechanism, a third damping mechanism, and a fourth damping mechanism, and a fifth damping mechanism. The first damping mechanism and the fifth damping mechanism are maximum damping force damping mechanisms, and the damping forces provided by the first damping mechanism, the fourth damping mechanism, the second damping mechanism, and the third damping mechanism decrease in order. During the early use of the connecting structure, the first damping mechanism and the fifth damping mechanism play the main role in damping. Since there are two maximum damping force damping mechanisms, the force uniformity during the early use of the connecting structure is improved.

Optionally, in some embodiments of the present application, the first damping mechanism, the second damping mechanism, the third damping mechanism, the fourth damping mechanism, and the fifth damping mechanism are arranged in order along the connecting seam. By setting the remaining damping mechanisms between the two maximum damping force damping mechanisms, along with the disposition of the third damping mechanism that provides the smallest damping force in the middle, the uniformity of the force on the hinge structure during use can be further improved.

Optionally, in some embodiments of the present application, the damping mechanism includes a guiding part having one end fixedly connected to the first connecting member, and the other end extending toward the second connecting member; a movable part having one end movably connected with the second connecting member, and the other end slidably mounted on the guiding part; wherein when the second connecting member rotates from the first position to the second position relative to the first connecting member under the action of an external force, a relative sliding occurs between the other end of the movable part and the guiding part, so that a frictional damping force is generated, and when the external force disappears, the other end of the movable part presses the guiding part.

Optionally, in some embodiments of the present application, the movable part includes a damping rod fixed on the first connecting member; and the movable part includes a rotating element pivotally connected to the second connecting member through a first rotating shaft; a connecting rod having one end connected with the rotating element; a damping block slidably connected with the damping rod, and the other end of the connecting rod being connected with the damping block; and an elastic element elastically pressing against the rotating element; wherein the rotating element is configured to exert a pressing force on the damping block through the connecting rod under an elastic pressing action of the elastic element, and the damping block compresses the damping rod under an action of the pressing force. When the second connecting element rotates to the second position under the action of external force, the damping block will slide in the first direction along the damping rod. At this time, the elastic element exerts the elastic force on the damping block through the connecting rod. The force will make the damping block have a tendency to slide along the damping rod in the second direction, and the first direction and the second direction are opposite to each other. At this time, under the elastic pressing action of the elastic element, the damping block thus compresses the damping rod under the action of the elastic force, and the frictional damping force is generated between the damping rod and the damping block. Since the rotating element is provided on the second connecting member and the damping rod is provided on the first connecting member, when the external force on the first connecting member and the second connecting member disappears, the damping force can keep the first connecting member and the second connecting member in a state when the external force disappears, thereby achieving hovering.

Optionally, in some embodiments of the present application, the other end of the connecting rod is pivotally connected to the damping block through a second rotating shaft. The other end of the connecting rod and the damping block are connected by rotation to increase the degree of freedom of rotation, so that the first connecting member and the second connecting member can operate at a larger rotation angle.

Optionally, in some embodiments of the present application, the second connecting member rotates around a first axis under the action of the external force, an extension direction of the second rotating shaft is consistent with an extension direction of the first axis, and an extension direction of the first rotating shaft is perpendicular to the extension direction of the second rotation shaft.

Optionally, in some embodiments of the present application, a number of the movable parts is two, and the two movable parts are symmetrically arranged on both sides of the damping rod. The two movable parts can generate symmetrical damping force, which can make the first connecting member and the second connecting member more stable during rotation or hovering.

Optionally, in some embodiments of the present application, when the second connecting member rotates to the second position relative to the first connecting member, the second connecting member is at an included angle greater than 0 and less than or equal to 180 with respect to the first connecting member.

Optionally, in some embodiments of the present application, the rotating element includes a rotating bottom plate and a stress receiving plate connected to the rotating bottom plate, the rotating bottom plate is pivotally connected to the second connecting member through the first rotating shaft, and the stress receiving plate is connected with the other end of the connecting rod. The stress receiving plate is provided to facilitate the connection with the connecting rod.

Optionally, in some embodiments of the present application, the rotating bottom plate and the force receiving plate are vertically connected. The vertical connection can make the stress receiving plate receive a largest moment and therefore minimize an external force.

Optionally, in some embodiments of the present application, the elastic element includes an elastic plate, one end of the elastic plate is fixed to the first rotating shaft or the second connecting member, and the other end of the elastic plate abuts against the rotating element. When the number of the damping mechanisms is more than one, different damping mechanisms may use elastic elements with different elastic coefficients, so as to achieve different damping forces provided by the multiple damping mechanisms.

Optionally, in some embodiments of the present application, the elastic element includes a torsion spring pivotally connected to the first rotating shaft or the second connecting member, wherein the torsion spring has a torsion arm abuts against the first rotating shaft or the second connecting member, and another torsion arm included in the torsion spring abuts against the rotating element. When the number of the damping mechanisms is more than one, different damping mechanisms may use torsion springs with different elastic coefficients, so as to achieve different damping forces provided by the multiple damping mechanisms.

Optionally, in some embodiments of the present application, the damping rod is an arc-shaped rod, one end of the arc-shaped rod is fixed on the first connecting member, and the other end of the arc-shaped rod extends in a direction of the second connecting member and is located on a same horizontal plane as the end of the arc-shaped rod fixed on the first connecting member. Since both ends of the arc-shaped rod are located on the same horizontal plane, the first connecting member and the second connecting member can only be rotated toward or away from each other within the included angle ranging from 0 to 180°, so as to prevent the first connecting member and the second connecting member from over rotating.

Optionally, in some embodiments of the present application, the first connecting member and the second connecting member are connected by the hinge mechanism.

Optionally, in some embodiments of the present application, the hinge mechanism includes a hinge base; a first rotating arm having one end rotatably connected with the hinge base, and the other end connected with the first connecting member; a second rotating arm having one end rotatably connected with the hinge base, and the other end connected with the second connecting member; and a synchronous transmission component, wherein one end of the first rotating arm and one end of the second rotating arm are drivably connected to the synchronous transmission component, respectively, so that the first rotating arm and the second rotating arm rotate toward or away from each other. The first rotating arm and the second rotating arm are rotated towards or away from each other through the synchronous transmission part. The first rotating arm drives the first connecting member to rotate, and the second rotating arm drives the second connecting member to rotate, so that the first connecting member and the second connecting member rotate toward or away from each other.

Optionally, in some embodiments of the present application, a first gear and a second gear are disposed on the hinge base, one end of the first rotating arm is fixedly connected to the first gear, and one end of the second rotating arm is fixedly connected to the second gear, wherein the synchronous transmission component includes a central gear, and the central gear meshes with the first gear and the second gear, respectively. Only one central gear is needed to realize the rotation of the first rotating arm and the second rotating arm toward or away from each other, and the simple structure is beneficial to intensive setting of a foldable device.

Optionally, in some embodiments of the present application, the hinge mechanism includes a first wing plate fixedly connected to the other end of the first rotating arm, and the first wing plate is fixedly connected to the first connecting member; a second wing plate fixedly connected to the other end of the second rotating arm, and the second wing plate is fixedly connected to the second connecting member. The first wing plate and the second wing plate are provided to facilitate the connection of the hinge mechanism with the first connecting member and the second connecting member. Bolts and nuts can be used to realize the connection between the first wing plate and the first connecting member and the connection between the second wing plate and the second connecting member, which is convenient for disassembly and assembly.

Optionally, in some embodiments of the present application, the hinge base has a side surface, which is provided with an accommodating cavity. The central gear, the first gear, and the second gear are arranged in the accommodating cavity; the accommodating cavity is provided with a first notch on a first side wall, and the other end of the first rotating arm extends through the first notch to the outside of the hinge base; the accommodating cavity is provided with a second notch on a second side wall, and the other end of the second rotating arm extends through the second notch to the outside of the hinge base. The central gear, the first gear, and the second gear arranged in the accommodating cavity can prevent dust, and can further prevent external objects from accidentally touching the central gear, the first gear, and the second gear.

In a second aspect, the present application further provides a foldable terminal device, including the above-mentioned connection structure, the first body installed and connected to the first connecting member of the connection structure, and the second body installed and connected to the second connecting member of the connection structure.

The present application has advantageous effects as follows: the present application provides a connection structure and a foldable terminal device are provided. The connection structure includes a first connecting member, a second connecting member, and a damping mechanism connected to the first connecting member and the second connecting member. In this application, the damping mechanism is configured to achieve hovering of the first connecting member and the second connecting member. Specifically, when the second connecting member rotates from the first position to the second position relative to the first connecting member under an action of an external force, the damping mechanism generates the damping force that hinders the rotation of the second connecting member. When the external force disappears, the damping mechanism keeps the second connecting member in the second position, thereby achieving arbitrary angle hovering in a wide range of angles. In addition, it can also feedback a certain sense of damping to users through the damping mechanism, thereby improving the user experience.

BRIEF DESCRIPTION OF DRAWINGS

In order to better illustrate the technical solutions in the embodiments of the present application, the following will briefly introduce the accompanying drawings that need to be used in the description of the embodiments. Apparently, the accompanying drawings in the following description show merely some embodiments of the present invention, and a person skilled in the art may still derive other drawings from these accompanying drawings without creative efforts.

DESCRIPTION OF PREFERRED EMBODIMENTS

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those skilled in the art without creative work shall fall within the protection scope of this application.

In the description of this application, it should be understood that the terms "first" and "second" are only used for descriptive purposes and are not to be construed as indicating or implying relative importance. Thus, features defining "first" or "second" may include one or more of the described features either explicitly or implicitly and therefore cannot be understood as a restriction on this application.

The present application provides a connection structure and a foldable terminal device, which will be described in detail below. It should be noted that the description order of the following embodiments is not intended to limit the preferred order of the embodiments of the present application.

Figure 1:
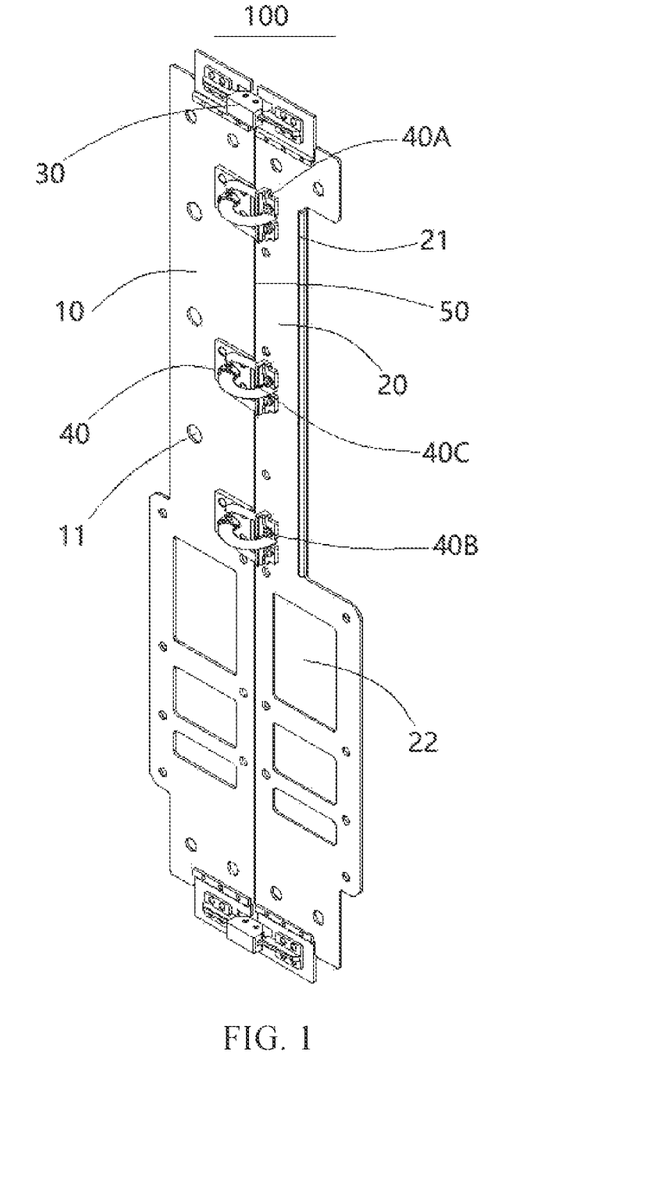
FIG. 1 is a schematic view of a first structure of a connection structure provided by the present application.

Please refer to FIG. 1, which is a schematic view of a first structure of a connection structure provided by the present application. The present application provides a connection structure 100 including a first connecting member 10, a second connecting member 20, a plurality of hinge mechanisms 30, and a plurality of damping mechanisms 40.

Specifically, the first connecting member 10 and the second connecting member 20 are connected by the hinge mechanisms 30. Specifically, the first connecting member 10 and the second connecting member 20 are drivably connected by the hinge mechanisms 30 to achieve rotation toward or away from each other. The hinge mechanisms can make the rotation of the first connecting member 10 and the second connecting member 20 smoother.

The damping mechanisms 40 are connected to the first connecting member and the second connecting member, respectively. Specifically, when the second connecting member 20 rotates from a first position to a second position relative to the first connecting member 10 under an action of an external force, the damping mechanisms 30 each generate a damping force that hinders the rotation of the second connecting member 20, and when the external force disappears, the damping mechanisms keep the second connecting member 20 in the second position.

In this application, the damping mechanism is configured to achieve hovering of the first connecting member and the second connecting member. Specifically, when the second connecting member rotates from the first position to the second position relative to the first connecting member under an action of an external force, the damping mechanism generates the damping force that hinders the rotation of the second connecting member. When the external force disappears, the damping mechanism keeps the second connecting member in the second position, thereby achieving arbitrary angle hovering in a wide range of angles. In addition, it can also feedback a certain sense of damping to users through the damping mechanism, thereby improving the user experience.

It should be noted that when the second connecting member 20 is in the first position, the damping mechanism can maintain the damping force. The damping force of the damping mechanism may also be zero. For example, when the second connecting member is in the first position and an angle between the second connecting member and the first connecting member is 180 degrees, the damping force of the damping mechanism is zero at this time. When the second connecting member is in the first position and the included angle between the second connecting member and the first connecting member is other than 180 degrees, the damping mechanism maintains the damping force.

In actual use, the connection structure of the present application can be applied to foldable devices, especially foldable terminal devices. When the connection structure of the present application is applied to a foldable terminal device, the foldable terminal device should have a first body and a second body. Specifically, the first connecting member of the connection structure is installed and connected with the first body, and the second connecting member of the connection structure is installed and connected with the second body, so that the first body and the second body are folded.

In some embodiments, the first connecting member 10 and the second connecting member 20 are provided with a plate-like structure, and the plate-like structure may be provided with a connecting portion connected with the foldable terminal device. The connecting portion includes a fixed buckle 21, a connecting hole 11, etc. In addition, some through holes 22 may be formed on the plate-like structure to facilitate arrangement of foldable terminal device cables.

As an improvement, in some embodiments, a number of the damping mechanisms 40 is N, wherein N is an integer, and a value of N is greater than or equal to 2. There is a connecting seam 50 between the first connecting member 10 and the second connecting member 20, and the N damping mechanisms 40 are sequentially arranged along the connecting seam 50 from top to bottom. By providing a plurality of the damping mechanisms, the uniformity of the force on the first connecting member and the second connecting member can be improved.

Specifically, at least M of the N damping mechanisms provide different damping forces, wherein M is an integer and $1 \leq M$. The N damping mechanisms 50 include at least a maximum damping force damping mechanism, and a number of the maximum damping force damping mechanism may be one or more. The maximum damping force damping mechanism is a damping mechanism with a largest damping force in the N damping mechanisms. That is, when the damping forces provided by the N damping mechanisms can be sequentially decreased, the damping forces provided by the N damping mechanisms are different; when M=N−1, there are N−1 damping mechanisms that provide different damping forces, which means that there are two damping mechanisms in the N damping mechanisms that provide a same damping force.

The number of damping mechanisms is provided in multiple forms, and the damping forces provided by the multiple damping mechanisms are not necessarily the same. Therefore, during the early use of the connection structure, when the first connecting member and the second connecting member rotate toward or away from each other, the maximum damping force damping mechanism plays a major role in damping. With the increase in the number of times a hinge structure is used, a damping effect of the maximum damping force damping mechanism continues to decrease, until the damping force provided by the maximum damping force damping mechanism is equivalent to the damping force provided by a sub-maximum damping force damping mechanism, the maximum damping force damping mechanism and the sub-maximum damping force damping mechanism play the main role in damping, and so on. When the maximum damping force damping mechanism provides a damping force equivalent to one of the other damping mechanisms, the maximum damping force damping mechanism and the one of the other damping mechanisms together play the main role in damping. In summary, the present application is provided with multiple damping mechanisms, and the multiple damping mechanisms provide different damping forces. Although the damping forces provided by the damping mechanisms will decrease with a length of time in use, the damping mechanisms can make the overall damping force drop more smoothly. Furthermore, service life of the connection structure can be prolonged, and a damping force reduction range during the service life is smaller, so that the user experience is better.

Specifically, in some embodiments, the value of N is three, and the three damping mechanisms 40 are a first damping mechanism 40A, a second damping mechanism 40B, and a third damping mechanism 40C, respectively. The first damping mechanism 40A is a maximum damping force damping mechanism, and a number of the maximum damping force damping mechanism is one. The damping force provided by the first damping mechanism 40A, the second damping mechanism 40B, and the third damping mechanism 40C decreases sequentially, and the remaining damping mechanisms provide two different damping forces. In this embodiment, during the early use of the connection structure, the first damping mechanism plays the main role in damping. As the use time increases, the damping force provided by the first damping mechanism decreases until it is the same as the damping force provided by the second damping mechanism. At this time, the first damping mechanism and the second damping mechanism play the main role in damping. Finally, the damping force provided by the first damping mechanism and the second damping mechanism and the damping force provided by the third damping mechanism are the same. The first damping mechanism, the second damping mechanism, and the third damping mechanism provide a same damping effect. The three damping mechanisms can make the overall damping force drop more smoothly, and the service life of the connection structure can be prolonged as well. Furthermore, the damping force reduction range during the service life is smaller, so that the user experience is better.

Specifically, the first damping mechanism 40A, the second damping mechanism 40B, and the third damping mechanism 40C can be arranged in multiple ways, namely: the first damping mechanism 40A, the second damping mechanism 40B, and the third damping mechanism 40C are arranged along the connecting seam in order from top to bottom; the third damping mechanism 40C, the second damping mechanism 40B, and the first damping mechanism 40A are arranged in order from top to bottom along the connecting seam; the second damping mechanism 40B, the third damping mechanism 40C, and the first damping mechanism 40A are arranged in order from top to bottom along the connecting seam; the first damping mechanism 40A, the third damping mechanism 40C, and the second damping mechanism 40B are arranged in order from top to bottom along the connecting seam; the second damping mechanism 40B, the first damping mechanism 40A, and the third damping mechanism 40C are arranged in order from top to bottom along the connecting seam; the third damping mechanism 40C, the first damping mechanism 40A, and the second damping mechanism 40B are arranged in order from top to bottom along the connecting seam.

However, in this embodiment, the third damping mechanism 40C is preferably located between the first damping mechanism 40A and the second damping mechanism 40B. Specifically, the first damping mechanism 40A, the third damping mechanism 40C, and the second damping mechanism 40B are arranged in order from top to bottom along the connecting seam. Setting the third damping mechanism that provides the smallest damping force in the middle can improve the uniformity of the force on the hinge structure during use. During the early use of the connection structure, the first damping mechanism plays the main role in damping. As the use time increases, the first damping mechanism and the second damping mechanism play the main damping role. At this time, the third damping mechanism is located between the first damping mechanism and the second damping mechanism. The damping forces provided by the first damping mechanism and the second damping mechanism are symmetrically distributed on upper and lower sides of the third damping mechanism, so that the uniformity of the force as applied can be improved.

Figure 5:
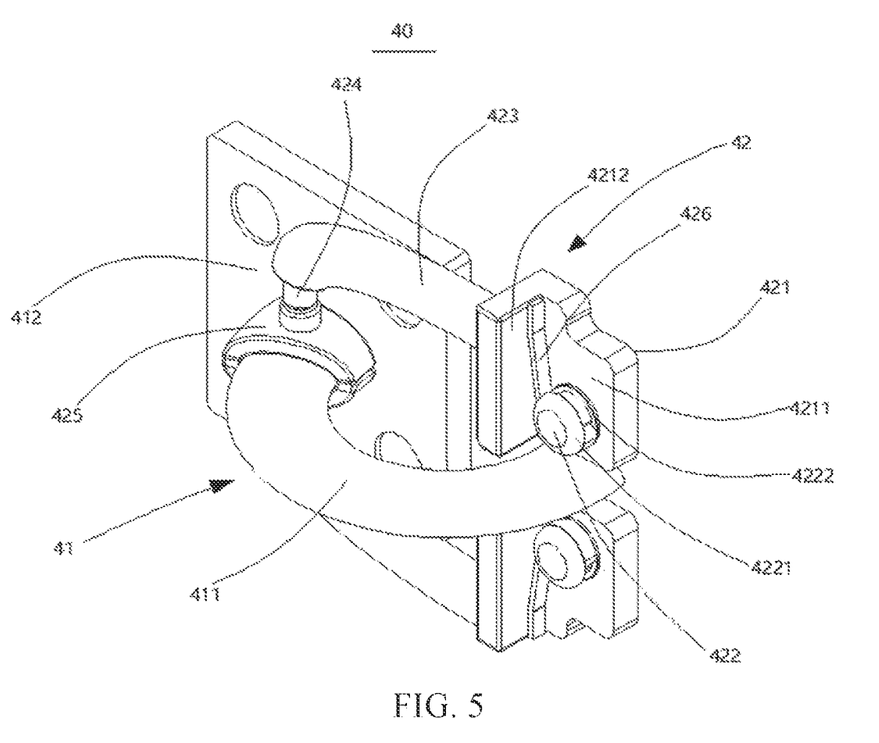
FIG. 5 is a schematic view showing a damping mechanism of the first structure of the connection structure provided by the present application.

Please refer to FIGS. 1 and 5. FIG. 5 is a schematic view showing a damping mechanism of the first structure of the connection structure provided by the present application. In some embodiments, the damping mechanism 40 includes a guiding part 41 and a movable part 42. One end of the guiding part 41 is fixedly connected to the first connecting member 10, and the other end extends toward the second connecting member 20. One end of the movable part 42 is movably connected with the second connecting member 20, and the other end is slidably mounted on the guiding part 41. Specifically, when the second connecting member 20 rotates from the first position to the second position relative to the first connecting member 10 under the action of the external force, a relative sliding occurs between the other end of the movable part 42 and the guiding part 41, so that a frictional damping force is generated; When the external force disappears, the other end of the movable part presses the guiding part. That is, in this embodiment, during the process that the second connecting member rotates from the first position to the second position relative to the first connecting member under the action of the external force, the frictional damping force is generated when the relative sliding occurs between the other end of the movable part and the guiding part. When the external force disappears, the other end of the movable part presses the guiding part, so that the second connecting member is maintained in the second position, thereby realizing hovering.

Specifically, in some embodiments, the guiding part 41 includes a damping rod 411 fixed on the first connecting member 10.

The movable part 42 includes a rotating element 421, a connecting rod 423, a damping block 425, and an elastic element 426. The rotating element 421 is pivotally connected to the second connecting member 20 through a first rotating shaft 422.

One end of the connecting rod 423 is connected to the rotating element 421.

The damping block 425 is slidably connected with the damping rod 411, and the other end of the connecting rod 423 is connected to the damping block 425.

The elastic element 426 elastically presses the rotating element 421. Specifically, the elastic element may be disposed on the first rotating shaft 422 or the second connecting member 20.

Specifically, the rotating element 421 exerts a pressing force on the damping block 425 through the connecting rod 423 under an elastic pressing action of the elastic element 426, so that the damping block 425 compresses the damping rod 411 under the action of the pressing force.

Figure 6:
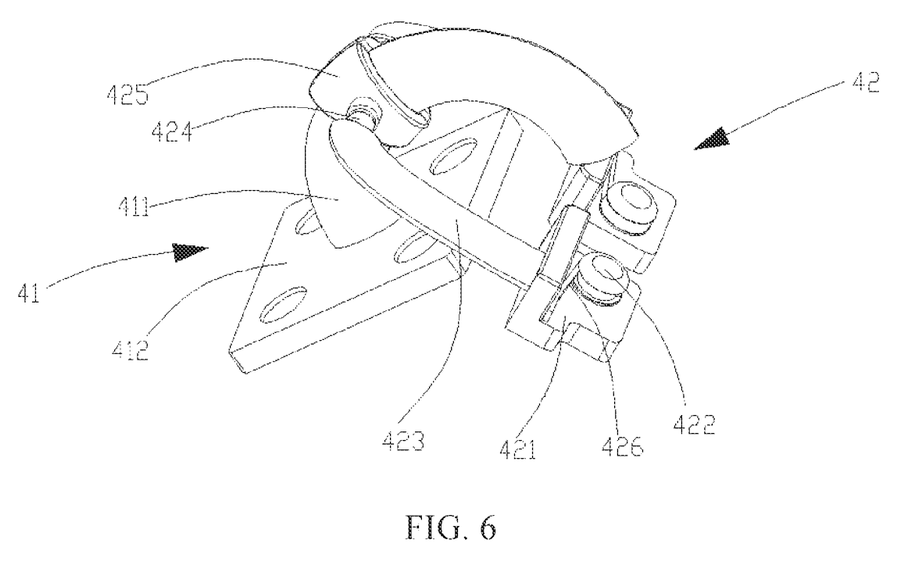
FIG. 6 is a schematic view of the first structure of the connection structure in a folded state provided by the present application.

Please refer to FIGS. 5 and 6. FIG. 6 is a schematic view of the first structure of the connection structure in a folded state provided by the present application. When an external force is applied to the first connecting member 10 and the second connecting member 20, the first connecting member 10 and the second connecting member 20 rotate toward each other. In this fashion, the first connecting member 10 and the second connecting member 20 are in a folded state, and the second connecting member 20 drives the damping block 425 to slide in a first direction along the damping rod 411 through the connecting rod 423. At the same time, the other end of the connecting rod 423 presses the rotating element 421, and the rotating element 421 presses the elastic element 426. The elastic element 426 generates elastic force, and the elastic force imparts a force to the damping block 425 through the connecting rod 423. In this fashion, the rotating element 421 exerts the pressing force on the damping block 425 through the connecting rod 423 under the elastic pressing action of the elastic element 426, so that the damping block 425 compresses the damping rod 411 under the action of the pressing force, and a frictional damping force is generated between the damping rod 411 and the damping block 425. Since the rotating element 421 is provided on the second connecting member 20 and the damping rod 411 is provided on the first connecting member 10, when the external force on the first connecting member 10 and the second connecting member 20 disappears, the damping force can keep the first connecting member 10 and the second connecting member 20 in a state when the external force disappears, thereby achieving hovering. If the first connecting member 10 and the second connecting member 20 are required to continue to rotate, it only needs an external force to overcome the damping force.

When an external force is given to the first connecting member 10 and the second connecting member 20, the first connecting member 10 and the second connecting member 20 rotate against each other, at this time the first connecting member 10 and the second connecting member 20 are opposite to each other in an expanded state. The second connecting member 20 drives the damping block 425 to slide in a second direction along the damping rod 411 through the connecting rod 423. At the same time, the other end of the connecting rod 423 presses the rotating element 421, the rotating element 421 pushes the elastic element 426, the elastic element 426 generates the elastic force, and the elastic force imparts a force to the damping block 425 through the connecting rod 423. The first direction and the second direction are opposite to each other. In this fashion, the rotating element 421 exerts the pressing force on the damping block 425 through the connecting rod 423 under the elastic pressing action of the elastic element 426, the damping block 425 thus compresses the damping rod 411 under the action of the pressing force, and the frictional damping force is generated between the damping rod 411 and the damping block 425. Since the rotating element 421 is provided on the second connecting member 20 and the damping rod 411 is provided on the first connecting member 10, when the external force on the first connecting member 10 and the second connecting member 20 disappears, the damping force can keep the first connecting member 10 and the second connecting member 20 in a state when the external force disappears, thereby achieving hovering. If the first connecting member 10 and the second connecting member 20 are required to continue to rotate, it only needs an external force to overcome the damping force.

Furthermore, in the foregoing embodiment, when the number of damping mechanisms is more than one, different damping mechanisms may use elastic elements 46 with different elastic coefficients, so as to realize that the damping forces provided by the multiple damping mechanisms are different.

Specifically, in some embodiments, the damping block 425 is slidably mounted on the damping rod 411, the damping block 425 is provided with a through hole, and the damping block 425 is mounted to the damping rod 411 through the through hole. Certainly, the damping block and the damping rod can also adopt other conventional sliding connection methods, as long as the relative sliding of the damping block and the damping rod can be achieved and the frictional damping force can be generated between the damping block and the damping rod. For example, a guide groove is provided on the damping rod, and the damping block is arranged in the guide groove and can slide along the guide groove.

In some embodiments, the other end of the connecting rod 423 is pivotally connected to the damping block 425 through a second rotating shaft 424. The other end of the connecting rod and the damping block are connected by rotation to increase the degree of freedom of rotation, so that the first connecting member and the second connecting member can operate at a larger rotation angle.

In some embodiments, the guiding part 41 further includes a fixed base 412, the fixed base 412 is fixed on the first connecting member 10, and the damping rod 411 is fixed on the fixed base 412. The fixed base facilitates the fixed connection between the damping rod and the first connecting piece.

In some embodiments, the second connecting member 20 rotates around a first axis under the action of the external force, an extension direction of the second rotating shaft 424 is consistent with an extension direction of the first axis, and an extension direction of the first rotating shaft 422 is perpendicular to the extension direction of the second rotation shaft 424. Specifically, the second rotating shaft is arranged on the second connecting member and is perpendicular to the second rotating shaft. In this manner, a rotation direction of the connecting rod can be kept the same as a rotation direction of the second connecting member through a simple structure.

Further, in some embodiments, a number of the movable parts 42 is two, and the two movable parts 42 are symmetrically arranged on both sides of the damping rod 411. The two movable parts can generate symmetrical damping force, which can make the first connecting member and the second connecting member more stable during rotation or hovering.

Specifically, in this embodiment, the other ends of the connecting rods 423 of the two movable parts 42 are pivotally connected to the same damping block 425, respectively, through the second rotating shaft 424, that is, the two movable parts 42 share a damping block; the damping rod 411 is arranged 4 between the two rotating elements 421, and the two rotating elements 421 are connected to the same damping block 425, respectively, through the connecting rod 423. Specifically, one end of the connecting rod 423 of each of the two movable parts 42 is pivotally connected to a side surface of the damping block 425 through the second rotating shaft 424. Since the rotation direction of the connecting rod is the same as the rotation direction of the second connecting member, the connecting rod uses a side connection mode with the damping block, which is convenient for installation and simplifies the connection mode.

In some embodiments, when the second connecting member 20 rotates to the second position relative to the first connecting member 10, the included angle between the second connecting member 20 and the first connecting member 10 is greater than 0 and less than or equal to 180.

Specifically, in some embodiments, the damping rod 411 is an arc-shaped rod, one end of the arc-shaped rod is fixed on the first connecting member 10, and the other end of the arc-shaped rod extends in a direction of the second connecting member 20 and is located on a same horizontal plane as the end of the arc-shaped rod fixed on the first connecting member. Since both ends of the arc-shaped rod are located on the same horizontal plane, the first connecting member and the second connecting member can only be rotated toward or away from each other within the included angle ranging from 0 to 180°, so as to prevent the first connecting member and the second connecting member from over rotating.

In addition, in some embodiments, the rotating element 421 includes a rotating bottom plate 4211 and a stress receiving plate 4212 connected to the rotating bottom plate 4211. The rotating bottom plate 4211 is pivotally connected to the second connecting member 20 through the first rotating shaft 422, and the stress receiving plate 4212 is connected to the other end of the connecting rod 423. Further, in some embodiments, the rotating bottom plate 4211 and the stress receiving plate 4212 are vertically connected, and the vertical connection can make the stress receiving plate receive a largest moment and therefore minimize an external force.

In some embodiments, the elastic element 426 includes an elastic plate. One end of the elastic plate is fixed to the first rotating shaft 422 or the second connecting member 20, and the other end of the elastic plate abuts against the stress receiving plate 4212. In this embodiment, one end of the elastic element is fixed to the first rotating shaft 422. Specifically, one end of the first rotating shaft 422 is fixed to the second connecting member 20, and the rotating bottom plate 4211 is rotatably mounted to the first rotating shaft 422 through a through hole. One end of the elastic plate is fixed to the first rotating shaft 422 and is located outside the rotating bottom plate 4211. Further, the other end of the first rotating shaft 422 extends to the outside of the rotating bottom plate 4211 and is provided with a first shoulder 4221 and a second shoulder 4222. The first shoulder 4221 is located on an outer side relative to the second shoulder 4222, the second shoulder 4222 limits an axial movement of the rotating bottom plate 4211 along the first rotating shaft 422, and one end of the elastic plate is fixed between the first shoulder 4221 and the second shoulder 4222. In this embodiment, when the number of the damping mechanisms is more than one, different damping mechanisms may use elastic elements with different elastic coefficients, so as to achieve different damping forces provided by the multiple damping mechanisms.

Figure 2:
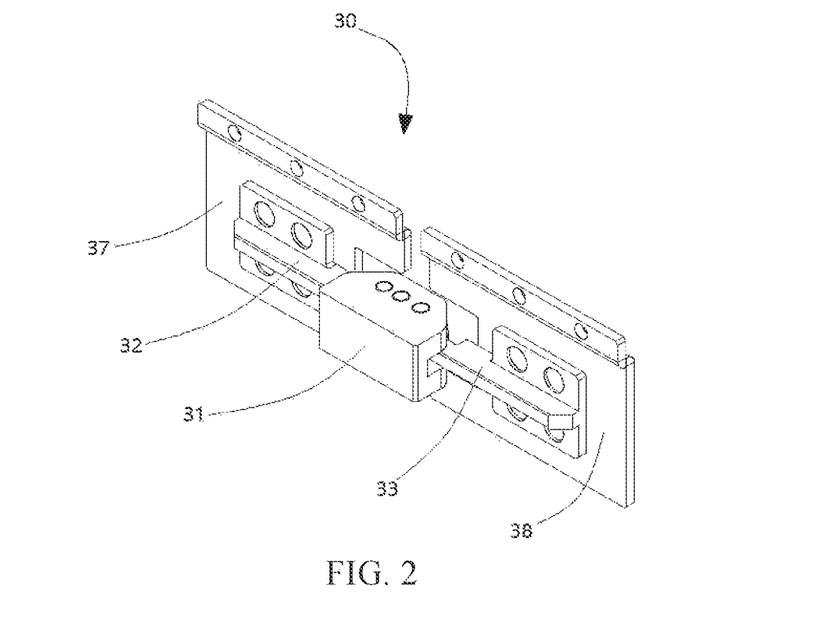
FIG. 2 is a schematic view of a hinge mechanism of a connection structure provided by the present application.
Figure 3:
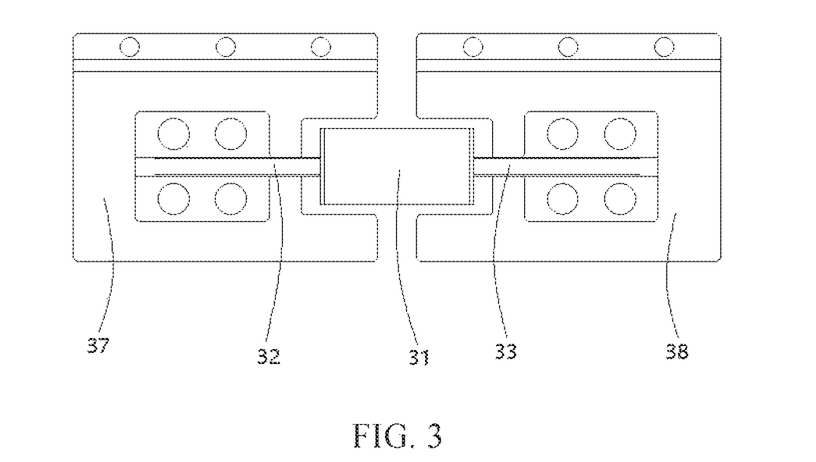
FIG. 3 is a front view of the hinge mechanism of FIG. 2.
Figure 4:
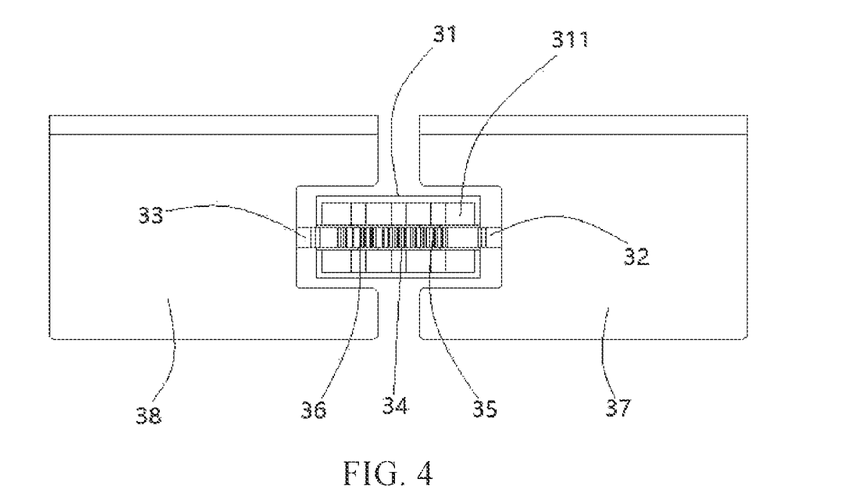
FIG. 4 is a rear view of the hinge mechanism of FIG. 2.

Please refer to FIGS. 2 to 4, which show a hinge mechanism of the connection structure provided by the present application. In some embodiments, the hinge mechanism 30 includes a hinge base 31, a first rotating arm 32, a second rotating arm 33, and a synchronous transmission component 34.

One end of the first rotating arm 32 is rotatably connected with the hinge base 31, and the other end is fixedly connected with the first connecting member 10; one end of the second rotating arm 33 is rotatably connected with the hinge base 31, and the other end is fixedly connected with the second connecting member 20; one end of the first rotating arm 32 and one end of the second rotating arm 33 are drivably connected to the synchronous transmission component 34, respectively, so that the first rotating arm 32 and the second rotating arm 34 rotate toward or away from each other. The first rotating arm and the second rotating arm are rotated towards or away from each other through the synchronous transmission part. The first rotating arm drives the first connecting member to rotate, and the second rotating arm drives the second connecting member to rotate, so that the first connecting member and the second connecting member rotate toward or away from each other.

Specifically, in some embodiments, the hinge base 31 is provided with a rotatable first gear 35 and a second gear 36. One end of the first rotating arm 32 is fixedly connected to the first gear 35, and one end of the second rotating arm 33 is fixedly connected to the second gear 36. The synchronous transmission component 34 includes a central gear which meshes with the first gear 35 and the second gear 36, respectively. Only one central gear is needed to realize the rotation of the first rotating arm and the second rotating arm toward or away from each other, and the simple structure is beneficial to intensive setting of a foldable device.

Further, in some embodiments, the hinge mechanism 30 further includes a first wing plate 37 and a second wing plate 38.

The first wing plate 37 is fixedly connected to the other end of the first rotating arm 32, and the first wing plate 37 is fixedly connected to the first connecting member 10; the second wing plate 38 is fixedly connected to the other end of the second rotating arm 33, and the second wing plate 38 is fixedly connected to the second connecting member 20. The first wing plate and the second wing plate are provided to facilitate the connection of the hinge mechanism with the first connecting member and the second connecting member. Bolts and nuts can be used to realize the connection between the first wing plate and the first connecting member and the connection between the second wing plate and the second connecting member, which is convenient for disassembly and assembly.

In addition, in some embodiments, in order to make the force applied to the first connecting member and the second connecting member more uniform during synchronous rotation, a number of the hinge mechanism 30 is two. The two hinge mechanisms 30 are arranged at upper ends and lower ends of the first connecting member 10 and the second connecting member 20, respectively.

Specifically, in some embodiments, the hinge base 31 has a side surface, which is provided with an accommodating cavity 311. The central gear, the first gear 35, and the second gear 36 are arranged in the accommodating cavity 311; the accommodating cavity 311 is provided with a first notch on a first side wall, and the other end of the first rotating arm 32 extends through the first notch to the outside of the hinge base 31; the accommodating cavity 311 is provided with a second notch on a second side wall, and the other end of the second rotating arm 33 extends through the second notch to the outside of the hinge base 31. The central gear, the first gear, and the second gear arranged in the accommodating cavity can prevent dust, and can further prevent external objects from accidentally touching the central gear, the first gear, and the second gear.

Figure 7:
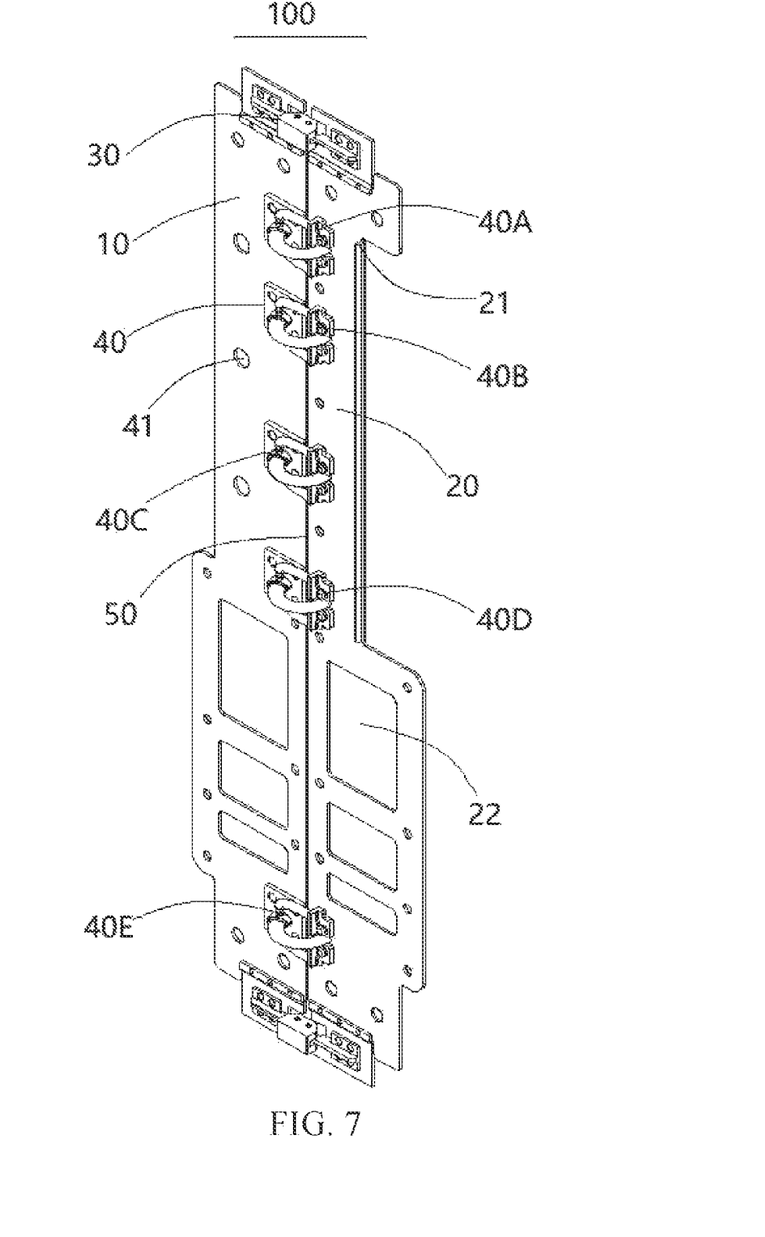
FIG. 7 is a schematic view of a second structure of a connection structure provided by the present application.

Please refer to FIG. 7, which is a schematic view of a second structure of the connection structure provided by the present application. This embodiment differs from the embodiment shown in FIG. 1 in that the value of N is five, and the five damping mechanisms 40 are a first damping mechanism 40A, a second damping mechanism 40B, a third damping mechanism 40C, a fourth damping mechanism 40D, and a fifth damping mechanism 40E, respectively. Specifically, the first damping mechanism 40A and the fifth damping mechanism 40E are maximum damping force damping mechanisms, a number of the maximum damping force damping mechanisms is two. Damping forces provided by the first damping mechanism 40A, the fourth damping mechanism 40D, the second damping mechanism 40B, and the third damping mechanism 40C decreases sequentially, and the remaining damping mechanisms provide three different values of damping forces.

In this embodiment, during the early use of the connection structure, the first damping mechanism and the fifth damping mechanism play the main role in damping. Due to the two maximum damping force damping mechanisms, the force uniformity of the connection structure during the early use process is improved. As the use time is getting longer, the damping force provided by the first damping mechanism and the fifth damping mechanism decreases until it is the same as the damping force provided by the fourth damping mechanism. At this time, the first damping mechanism, the fifth damping mechanism, and the fourth damping mechanism play the main role in damping; then, the damping force provided by each of the first damping mechanism, the fifth damping mechanism, and the fourth damping mechanism is same as the damping force provided by the second damping mechanism, so that the first damping mechanism, the fifth damping mechanism, and the fourth damping mechanism each provide a same damping effect as that of the second damping mechanism; finally, the damping force provided by each of the first damping mechanism, the fifth damping mechanism, the fourth damping mechanism, and the second damping mechanism is same as the damping force provided by the third damping mechanism, the five damping mechanisms provide the same damping effect. Accordingly, the five damping mechanisms can make the overall damping force decrease more smoothly, and can further increase the service life of the connection structure, and the damping force reduction range during the service life is smaller, so that the user experience is better.

Additionally, in the above embodiment, the first damping mechanism 40A, the second damping mechanism 40B, the third damping mechanism 40C, the fourth damping mechanism 40D, and the fifth damping mechanism 40E are arranged in order from top to bottom along the connecting seam. By setting the two maximum damping force damping mechanisms at an uppermost position and a lowermost position, and the remaining damping mechanisms between the two maximum damping force damping mechanisms, along with the disposition of the third damping mechanism that provides the smallest damping force in the middle, the uniformity of the force on the hinge structure during use can be further improved.

Figure 8:
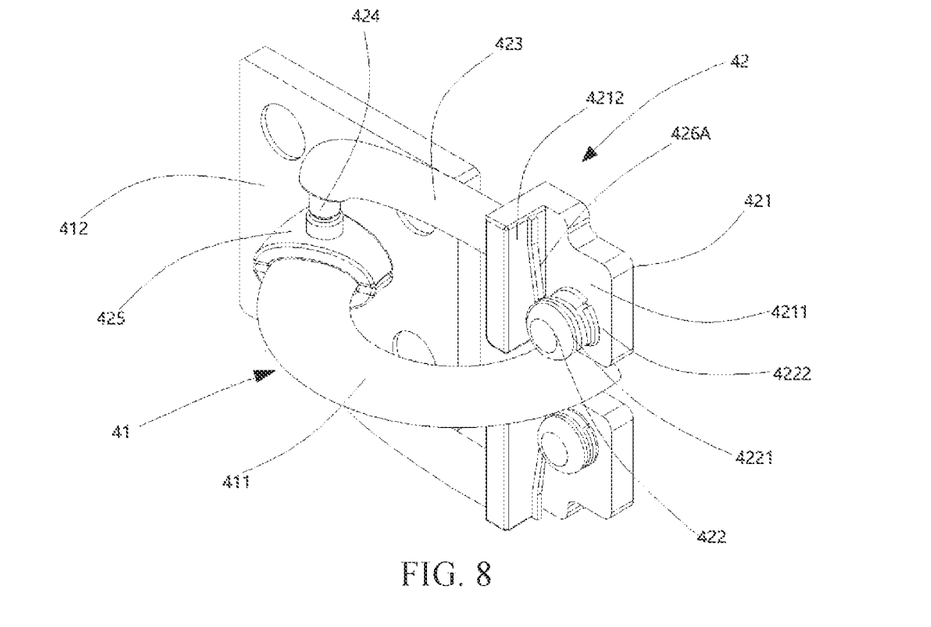
FIG. 8 is a schematic view showing a damping mechanism of a third structure of a connection structure provided by the present application.
Figure 9:
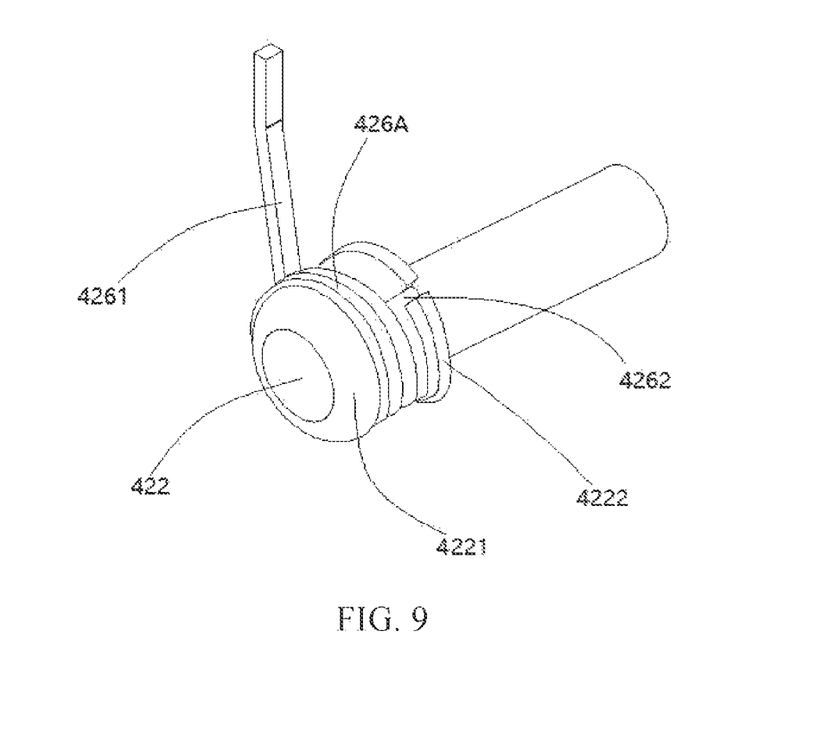
FIG. 9 is a schematic view showing an elastic element of the damping mechanism of the third structure of the connection structure provided by the present application.

Please refer to FIGS. 8 and 9. FIG. 8 is a schematic view showing a damping mechanism of a third structure of the connection structure provided by the present application. This embodiment differs from the embodiment shown in FIG. 1 in that the elastic element 462A includes a torsion spring pivotally connected to the first rotating shaft 422 or the second connecting member 20; the torsion spring has a torsion arm 4261 abuts against the first rotating shaft 422 or the second connecting member 20, and another torsion arm 4262 included in the torsion spring abuts against the stress receiving plate 4212.

In this embodiment, the torsion spring is pivotally connected to the first rotating shaft 422, the torsion arm 4261 of the torsion spring abuts against the first rotating shaft 422. Specifically, the other end of the first rotating shaft 422 extends out of the rotating bottom plate 4211, and the other end of the first rotating shaft 422 is provided with a first shoulder 4221 and a second shoulder 4222. The first shoulder 4221 is located on an outer side with respect to the second shoulder 4222, and the second shoulder 4222 limits the movement of the rotating bottom plate 4211 along an axial direction of the first rotating shaft 422. The torsion spring is pivotally connected between the first shoulder 4221 and the second shoulder 4222, and the torsion arm 4261 of the torsion spring abuts against the second shoulder 4222. In this embodiment, when the number of the damping mechanisms is more than one, different damping mechanisms may use torsion springs with different elastic coefficients, so as to achieve different damping forces provided by the multiple damping mechanisms.

In addition, the present application further provides a foldable terminal device, including the above-mentioned connection structure 100, the first body installed and connected to the first connecting member 10 of the connection structure 100, and the second body installed and connected to the second connecting member 20 of the connection structure 100.

Compared with the prior art, the beneficial effects of the foldable terminal device provided by the embodiments of the present application are the same as the beneficial effects of the foldable terminal device provided by the foregoing technical solutions, and will not be repeated here.

The connection structure and the foldable terminal device provided by the embodiments of the present application are described in detail above. Specific examples are used in this article to illustrate the principles and implementation of the application, and the descriptions of the above examples are only used to help understand the methods and core ideas of the application; In addition, for those skilled in the art, according to the idea of the application, there will be changes in the specific implementation and the scope of application. In summary, the content of this specification should not be construed as a limitation of the application.

What is claimed is:

1. A connection structure, comprising:
   a first connecting member;
   a second connecting member;
   a damping mechanism connected to the first connecting member and the second connecting member;
   wherein when the second connecting member rotates from a first position to a second position relative to the first connecting member under an action of an external force, the damping mechanism generates a damping force that hinders the rotation of the second connecting member, and when the external force disappears, the damping mechanism keeps the second connecting member in the second position;
   wherein a number of the damping mechanisms is N, N is an integer, and a value of N is greater than or equal to two, wherein a connecting seam is located between the first connecting member and the second connecting member, and the N damping mechanisms are sequentially arranged along the connecting seam;
   wherein at least M of the N damping mechanisms provide different damping forces, M is an integer, and 1≤M<N;
   wherein the value of N is three, and the three damping mechanisms are a first damping mechanism, a second damping mechanism, and a third damping mechanism, respectively, wherein the damping forces provided by the first damping mechanism, the second damping mechanism, and the third damping mechanism gradually decrease.

2. The connection structure of claim 1, wherein the value of N is five, and the five damping mechanisms are a first damping mechanism, a second damping mechanism, a third damping mechanism, and a fourth damping mechanism, and a fifth damping mechanism, wherein the first damping mechanism and the fifth damping mechanism are maximum damping force damping mechanisms, and the damping forces provided by the fourth damping mechanism, the second damping mechanism, and the third damping mechanism decrease in order.

3. The connection structure of claim 2, wherein the first damping mechanism, the second damping mechanism, the third damping mechanism, the fourth damping mechanism, and the fifth damping mechanism are arranged in sequence along the connecting seam.

4. The connecting structure of claim 1, wherein when the second connecting member rotates to the second position relative to the first connecting member, the second connecting member is at an included angle greater than 0 and less than or equal to 180 with respect to the first connecting member.

5. The connection structure of claim 1, further comprising a hinge mechanism connected with the first connecting member and the second connecting member, respectively.

6. The connection structure of claim 5, wherein the hinge mechanism comprises:
a hinge base;
a first rotating arm having one end rotatably connected with the hinge base, and the other end connected with the first connecting member;
a second rotating arm having one end rotatably connected with the hinge base, and the other end connected with the second connecting member; and
a synchronous transmission component, wherein one end of the first rotating arm and one end of the second rotating arm are drivably connected to the synchronous transmission component, respectively.

7. The connection structure of claim 6, wherein a first gear and a second gear are disposed on the hinge base, one end of the first rotating arm is fixedly connected to the first gear, and one end of the second rotating arm is fixedly connected to the second gear, wherein the synchronous transmission component includes a central gear, and the central gear meshes with the first gear and the second gear, respectively.

8. A connection structure comprising:
a first connecting member;
a second connecting member;
a damping mechanism connected to the first connecting member and the second connecting member;
wherein when the second connecting member rotates from a first position to a second position relative to the first connecting member under an action of an external force, the damping mechanism generates a damping force that hinders the rotation of the second connecting member, and when the external force disappears, the damping mechanism keeps the second connecting member in the second position;
wherein the damping mechanism comprises:
a guiding part having one end fixedly connected to the first connecting member, and the other end extending toward the second connecting member;
a movable part having one end movably connected with the second connecting member, and the other end slidably mounted on the guiding part;
wherein when the second connecting member rotates from the first position to the second position relative to the first connecting member under the action of the external force, a relative sliding occurs between the other end of the movable part and the guiding part, so that a frictional damping force is generated, and when the external force disappears, the other end of the movable part presses the guiding part.

9. The connection structure of claim 8, wherein the guiding part comprises:
a damping rod fixed on the first connecting member; and
the movable part comprises:
a rotating element pivotally connected to the second connecting member through a first rotating shaft;
a connecting rod having one end connected with the rotating element;
a damping block slidably connected with the damping rod, and the other end of the connecting rod being connected with the damping block; and
an elastic element elastically pressing against the rotating element;
wherein the rotating element is configured to exert a pressing force on the damping block through the connecting rod under an elastic pressing action of the elastic element, and the damping block compresses the damping rod under an action of the pressing force.

10. The connecting structure of claim 9, wherein the other end of the connecting rod is pivotally connected to the damping block through a second rotating shaft.

11. The connection structure of claim 10, wherein the second connecting member rotates around a first axis under the action of the external force, an extension direction of the second rotating shaft is consistent with an extension direction of the first axis, and an extension direction of the first rotating shaft is perpendicular to the extension direction of the second rotation shaft.

12. The connection structure of claim 9, wherein a number of the movable parts is two, and the two movable parts are symmetrically arranged on both sides of the damping rod.

13. The connection structure of claim 9, wherein the rotating element comprises a rotating bottom plate and a stress receiving plate connected to the rotating bottom plate, the rotating bottom plate is pivotally connected to the second connecting member through the first rotating shaft, and the stress receiving plate is connected with the other end of the connecting rod.

14. The connection structure of claim 9, wherein the elastic element comprises an elastic plate, one end of the elastic plate is fixed to the first rotating shaft or the second connecting member, and the other end of the elastic plate abuts against the rotating element.

15. The connection structure of claim 9, wherein the elastic element comprises a torsion spring pivotally connected to the first rotating shaft or the second connecting member, wherein the torsion spring has a torsion arm abuts against the first rotating shaft or the second connecting member, and another torsion arm included in the torsion spring abuts against the rotating element.

16. The connection structure of claim 9, wherein the damping rod is an arc-shaped rod, one end of the arc-shaped rod is fixed on the first connecting member, and the other end of the arc-shaped rod extends in a direction of the second connecting member and is located on a same horizontal plane as the end of the arc-shaped rod fixed on the first connecting member.

17. A foldable terminal device, comprising a connection structure, a first body installed and connected to a first connecting member of the connection structure, and a second body installed and connected to a second connecting member of the connection structure;
wherein the connection structure comprises:
a first connecting member;
a second connecting member; and
a damping mechanism connected to the first connecting member and the second connecting member, respectively;
wherein when the second connecting member rotates from a first position to a second position relative to the first connecting member under an action of an external force, the damping mechanism generates a damping force that hinders the rotation of the second connecting member, and when the external force disappears, the damping mechanism keeps the second connecting member in the second position;

wherein a number of the damping mechanisms is N, N is an integer, and a value of N is greater than or equal to two, wherein a connecting seam is located between the first connecting member and the second connecting member, and the N damping mechanisms are sequentially arranged along the connecting seam;

wherein at least M of the N damping mechanisms provide different damping forces, M is an integer, and $1 \leq M < N$;

wherein the value of N is three, and the three damping mechanisms are a first damping mechanism, a second damping mechanism, and a third damping mechanism, respectively, wherein the damping forces provided by the first damping mechanism, the second damping mechanism, and the third damping mechanism gradually decrease.

\* \* \* \* \*